(12) United States Patent
Kosaka et al.

(10) Patent No.: US 7,024,361 B2
(45) Date of Patent: Apr. 4, 2006

(54) INFORMATION PROCESSING APPARATUS AND METHOD, A COMPUTER READABLE MEDIUM STORING A CONTROL PROGRAM FOR MAKING A COMPUTER IMPLEMENTED INFORMATION PROCESS, AND A CONTROL PROGRAM FOR SELECTING A SPECIFIC GRAMMAR CORRESPONDING TO AN ACTIVE INPUT FIELD OR FOR CONTROLLING SELECTION OF A GRAMMAR OR COMPRISING A CODE OF A SELECTION STEP OF SELECTING A SPECIFIC GRAMMAR

(75) Inventors: Tetsuo Kosaka, Kanagawa (JP); Takaya Ueda, Kanagawa (JP); Fumiaki Ito, Kanagawa (JP); Hiroki Yamamoto, Kanagawa (JP); Yuji Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/289,366

(22) Filed: Nov. 7, 2002

(65) Prior Publication Data
US 2003/0097264 A1      May 22, 2003

Related U.S. Application Data

(60) Division of application No. 09/987,834, filed on Nov. 16, 2001, now Pat. No. 6,587,820, which is a continuation of application No. PCT/JP01/08923, filed on Oct. 11, 2001.

(30) Foreign Application Priority Data
Oct. 11, 2000    (JP)    ............................. 2000-311100

(51) Int. Cl.
    *G10L 15/18*    (2006.01)
(52) U.S. Cl. .................. 704/257; 704/251; 704/255
(58) Field of Classification Search ................ 704/255, 704/270, 235, 272, 260; 379/88.01
    See application file for complete search history.

(56) References Cited

U.S. PATENT DOCUMENTS

| 5,208,863 | A | 5/1993 | Sakurai et al. ............... 381/43 |
| 5,220,629 | A | 6/1993 | Kosaka et al. ............... 381/52 |
| 5,369,728 | A | 11/1994 | Kosaka et al. ............. 395/2.63 |
| 5,621,849 | A | 4/1997 | Sakurai et al. ............. 395/2.5 |

(Continued)

FOREIGN PATENT DOCUMENTS

EP    0 702 355    3/1996

(Continued)

OTHER PUBLICATIONS

IBM Technical Disclosure Bulletin, "Integrated Audio-Graphics User Interface," vol. 33, No. 11, Apr. 1991, pp. 368-371.

*Primary Examiner*—Susan McFadden
(74) *Attorney, Agent, or Firm*—Fitzpatrick, Cella, Harper & Scinto

(57) ABSTRACT

An information processing apparatus inputs a document having a plurality of input fields, and displays it using a display control item. The apparatus then determines whether or not one of the plurality of input fields is designated by the user. Specific grammar corresponding to the designated input field is selected from a grammar holding unit for holding a plurality of types of grammar, and the selected grammar is used in a speech recognition process.

12 Claims, 13 Drawing Sheets

U.S. PATENT DOCUMENTS

| | | | | |
|---|---|---|---|---|
| 5,664,061 | A | 9/1997 | Andreshak et al. | |
| 5,875,448 | A | 2/1999 | Boys et al. | 704/201 |
| 5,890,123 | A * | 3/1999 | Brown et al. | 704/270.1 |
| 5,924,067 | A | 7/1999 | Kosaka et al. | 704/256 |
| 5,956,679 | A | 9/1999 | Komori et al. | 704/256 |
| 5,970,445 | A | 10/1999 | Yamamoto et al. | 704/230 |
| 6,108,628 | A | 8/2000 | Komori et al. | 704/256 |
| 6,182,046 | B1 * | 1/2001 | Ortega et al. | 704/275 |
| 6,216,104 | B1 * | 4/2001 | Moshfeghi et al. | 704/260 |
| 6,236,962 | B1 | 5/2001 | Kosaka et al. | 704/234 |
| 6,236,964 | B1 | 5/2001 | Tamura et al. | 704/254 |
| 6,266,636 | B1 | 7/2001 | Kosaka et al. | 794/244 |
| 6,298,324 | B1 | 10/2001 | Zuberec et al. | 704/251 |
| 6,301,560 | B1 | 10/2001 | Masters | 704/251 |
| 6,418,199 | B1 * | 7/2002 | Perrone | 379/88.01 |
| 6,434,547 | B1 * | 8/2002 | Mishelevich et al. | 707/3 |
| 6,446,081 | B1 * | 9/2002 | Preston | 707/104.1 |
| 6,510,417 | B1 * | 1/2003 | Woods et al. | 704/257 |
| 6,513,063 | B1 * | 1/2003 | Julia et al. | 709/219 |
| 6,587,820 | B1 * | 7/2003 | Kosaka et al. | 704/257 |
| 6,600,736 | B1 * | 7/2003 | Ball et al. | 370/352 |
| 6,662,157 | B1 * | 12/2003 | Horowitz et al. | 704/235 |
| 6,687,734 | B1 * | 2/2004 | Sellink et al. | 709/203 |
| 6,728,708 | B1 * | 4/2004 | Yotka et al. | 707/6 |
| 6,757,657 | B1 * | 6/2004 | Kojima et al. | 704/275 |
| 6,757,718 | B1 * | 6/2004 | Halverson et al. | 709/218 |
| 2002/0178008 | A1 * | 11/2002 | Reynar | 704/272 |

FOREIGN PATENT DOCUMENTS

| | | |
|---|---|---|
| EP | 0 851 403 | 11/1997 |
| EP | 0 854 418 | 7/1998 |
| GB | 2 338 369 A | 12/1999 |
| JP | 6-85983 | 3/1994 |
| JP | 9-258886 | 10/1997 |
| JP | 11-184605 | 7/1999 |
| JP | 2000-10691 | 1/2000 |
| JP | 2000-268045 | 9/2000 |
| WO | WO 00/19410 | 4/2000 |
| WO | WO 00/29936 | 5/2000 |

\* cited by examiner

FIG. 4

| FIELD NUMBER | VALUE | GRAMMAR ID |
|---|---|---|
| 1 | | GRAMMAR A |
| 2 | | GRAMMAR B |
| 3 | | GRAMMAR C |
| ⋮ | ⋮ | ⋮ |

FIG. 5

| GRAMMAR ID | GRAMMAR DATA |
|---|---|
| GRAMMAR A | < DESCRIPTION OF GRAMMAR A > |
| GRAMMAR B | < DESCRIPTION OF GRAMMAR B > |
| GRAMMAR C | < DESCRIPTION OF GRAMMAR C > |
| ⋮ | ⋮ |

FIG. 10

```
<html>
<body>
101 ── <form gramselect="display">
102 ──   <p>ARTIST NAME  <input type="text" size="20" grammar="http://temp/art.grm"></p>
103 ──   <p>SONG NAME    <input type="text" size="20" grammar="http://temp/kyoku.grm"></p>
104 ──   <p>CM NAME      <input type="text" size="20" grammar="http://temp/cm.grm"></p>
105 ──   <p>RANK NAME    <input type="text" size="20" grammar="http://temp/rank.grm"></p>
       </form>
</body>
</html>
```

INFORMATION PROCESSING APPARATUS AND METHOD, A COMPUTER READABLE MEDIUM STORING A CONTROL PROGRAM FOR MAKING A COMPUTER IMPLEMENTED INFORMATION PROCESS, AND A CONTROL PROGRAM FOR SELECTING A SPECIFIC GRAMMAR CORRESPONDING TO AN ACTIVE INPUT FIELD OR FOR CONTROLLING SELECTION OF A GRAMMAR OR COMPRISING A CODE OF A SELECTION STEP OF SELECTING A SPECIFIC GRAMMAR

This is a divisional application of application Ser. No. 09/987,834 filed on Nov. 16, 2001, issued as U.S. Pat. No. 6,587,820 on Jul. 1, 2003, which is a continuation of PCT Application No. PCT/JP01/08923 filed on Oct. 11, 2001.

TECHNICAL FIELD

The present invention relates to an information processing apparatus, an information processing method, and a storage medium and, more particularly, to an apparatus and method for executing an information process by combining a speech input and GUI.

BACKGROUND ART

Along with the advances in speech-recognition-synthesis techniques, a speech information input apparatus has been put into practical application. Furthermore, an information input apparatus that combines speech and another means is also available. In such apparatus, respective means can compensate for each other's disadvantages, and can exploit each other's advantages.

As such apparatus, an interface apparatus that combines a speech input and GUI is known. By inputting information while exploiting the merits of the speech input and GUI, their disadvantages are compensated for.

More specifically, speech is a natural interface means for a human being, and makes it easy to perform input/output operations, but has no browsability. On the other hand, as GUI has browsability as output means, and it allows easy input of, e.g., menu selection as input means for browsably displaying input fields. However, with the GUI it is harder to freely input (this disadvantage is conspicuous in case of ten-key input and handwriting input).

For example, a music search system having an interface shown in FIG. 8 will be described below. This system can search for a song based on one or a plurality of artists' names, a song name, and a name of CM using that song. The GUI (screen display) is used as output means, and speech is used as input means to respective input fields.

In this case, since a screen display is made, the user can easily understand that he or she can perform a search using any of the artist name, the song name, and the CM name. Since input can be made to the respective input fields by means of speech, it is easy to input.

Speech contents input to the respective input fields are recognized using different grammars. For example, the artist name, song name, and CM name are respectively recognized using the grammars of the CM name.

When speech input and the GUI are used together, and there are a plurality of input fields, as shown in FIG. 8, and an input field corresponding to a given speech input must be discriminated.

As a method for this purpose, speech recognition is made simultaneously using the grammars for all the input fields, and an input field corresponding to the input is determined based on the obtained recognition result.

In the example shown in FIG. 8, speech recognition is made simultaneously using the grammars for the artist name, the song name, and the CM name, and if the recognition result indicates a CM name, an input to the CM name input field can be determined.

Note that the speech recognition rate normally decreases as the grammar becomes larger in scale. Hence, when grammars for a plurality of input fields are simultaneously used, the recognition rate for the speech input decreases.

DISCLOSURE OF INVENTION

The present invention has been made in consideration of the aforementioned problems, and has as its object to improve the recognition rate of speech input by preventing an increase in grammar scale used in speech recognition even when a plurality of input fields are available.

In order to achieve the above object, an information processing apparatus according to the present invention comprises the following arrangement. That is, an image processing apparatus comprises:

input means for inputting a document having a plurality of input fields;

discrimination means for discriminating an active input field from the plurality of input fields in accordance with a display state of the document; and selection means for selecting a specific grammar corresponding to the active input item discriminated by the discrimination means.

In order to achieve the above object, an information processing apparatus according to another aspect of the present invention comprises the following arrangement. That is, an information processing apparatus comprises:

input means for inputting a document having a plurality of input fields;

determining means for determining whether or not the document contains a designation for selecting a specific grammar in accordance with a display state of the document; and control means for controlling selection of a grammar according to a determining result.

In order to achieve the above object, an information processing method according to the present invention comprises:

the input step of inputting a document having a plurality of input fields;

the discrimination step of discriminating an active input field from the plurality of input fields in accordance with a display state of the document; and the selection step of selecting a specific grammar corresponding to the active input field discriminated in the discrimination step.

Furthermore, in order to achieve the above object, an information processing method according to the present invention comprises:

the input step of inputting a document having a plurality of input fields;

the determining step of determining whether or not the document contains a designation for selecting a specific grammar in accordance with a display state of the document; and the control step of controlling selection of a grammar according to a determining result.

Also, according to the present invention, a control program for making a computer execute the information processing method, a computer readable medium that stores the control program, and a computer program product are provided.

BRIEF DESCRIPTION OF DRAWINGS

FIG. 4 is a table showing an example of the data format of a field information holding unit;

FIG. 5 is a table showing an example of the data format of a grammar holding unit;

FIG. 10 shows an example of expression by means of a hypertext document;

BEST MODE FOR CARRYING OUT THE INVENTION (First Embodiment)

The present invention will be described in detail hereinafter with reference to the accompanying drawings.

Figure 1:
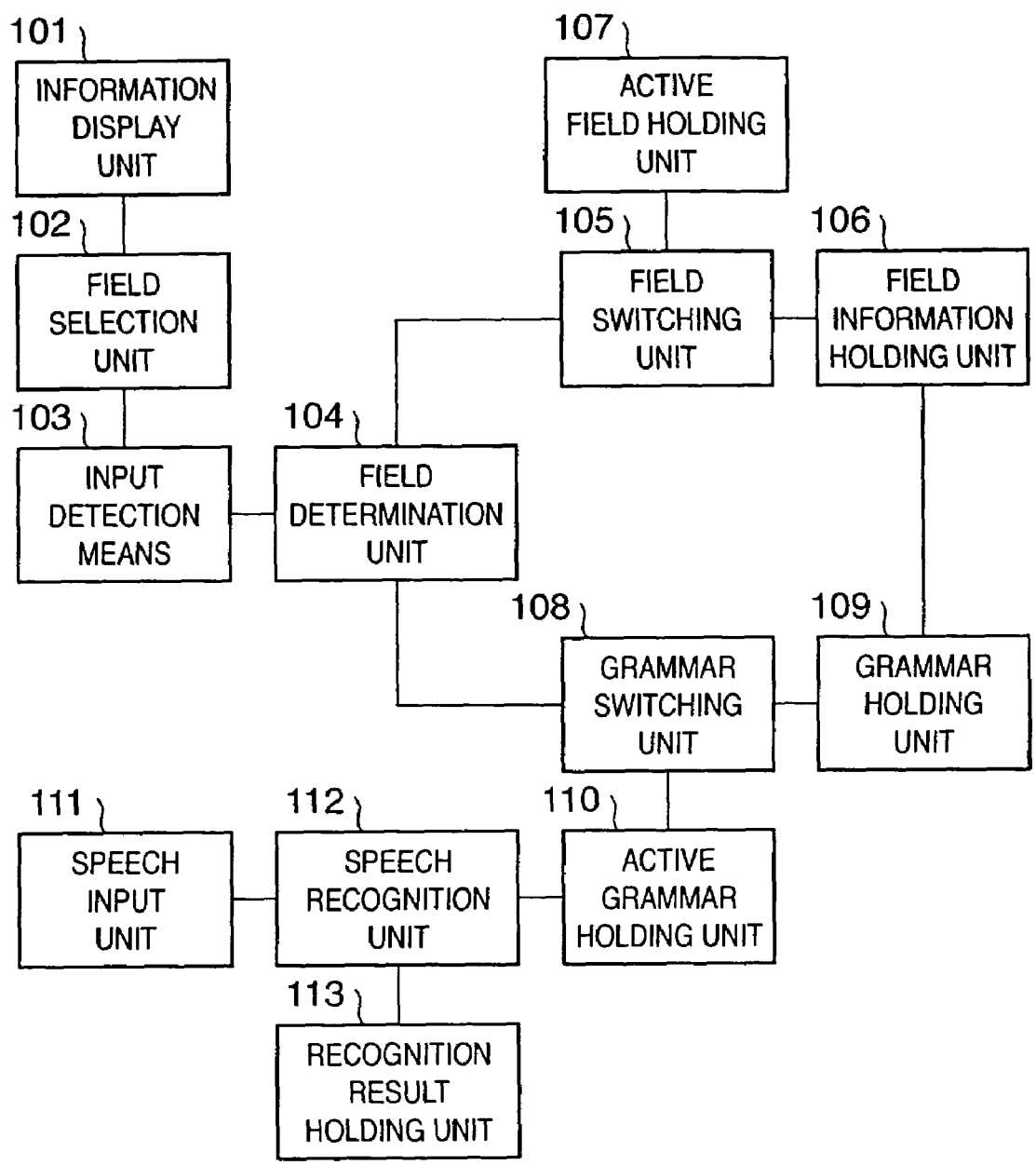
FIG. 1 is a block diagram showing a basic arrangement of a speech interface apparatus according to the first embodiment of the present invention.

FIG. 1 is a block diagram showing a basic arrangement of an apparatus according to the first embodiment of an information input apparatus, an information input method, and a storage medium of the present invention.

Referring to FIG. 1, reference numeral 101 denotes an information display unit. The information display unit 101 also displays information of input fields. Reference numeral 102 denotes a field selection unit for selecting one of the input fields displayed on the information display unit 101. Reference numeral 103 denotes an input detection unit for detecting if a signal indicating selection of a given input field is received from the field selection unit 102.

Reference numeral 104 denotes a field determination unit for determining a selected input field on the basis of a select signal sent from the field selection unit 102 via the input detection unit 103. Note that an input field selected by the field selection unit 102 will be referred to as an active field hereinafter.

Reference numeral 105 denotes a field switching unit for switching an active field on the basis of the determination result of the field determination unit 104. Reference numeral 106 denotes a field information holding unit for holding information for all the input fields in the currently displayed contents. The contents of the field information holding unit 106 are as shown in, e.g., FIG. 4.

More specifically, as shown in FIG. 4, numbers are assigned to input fields, and the field information holding unit holds the input field numbers, their values (no values are set in a default state), and IDs of grammars used in speech recognition of the corresponding input fields.

Reference numeral 107 denotes an active field holding unit for holding an active field. Reference numeral 108 denotes a grammar switching unit for switching a grammar on the basis of the determination result of the field determination unit 105. Note that the grammar selected by the grammar switching unit 108 will be referred to as an active grammar hereinafter.

Reference numeral 109 denotes a grammar holding unit for holding all grammars used in speech input in the contents currently displayed on the information display unit 101. The contents of the grammar holding unit 109 include grammar IDs and a description of the grammars, as shown in, e.g., FIG. 5. Information associated with a grammar to be used is described in the displayed contents (this will be described later with reference to FIG. 10). Assume that the grammar itself can be acquired from a disk device (not shown) and a server (not shown) on the network.

Reference numeral 110 denotes an active grammar holding unit for holding the ID of an active grammar. Reference numeral 111 denotes a speech input unit for inputting speech. Reference numeral 112 denotes a speech recognition unit for recognizing speech input from the speech input unit 111 using the grammar held in the active grammar holding unit 110. Reference numeral 113 denotes a recognition result holding unit for holding the recognition result of the speech recognition unit 112.

Figure 2:
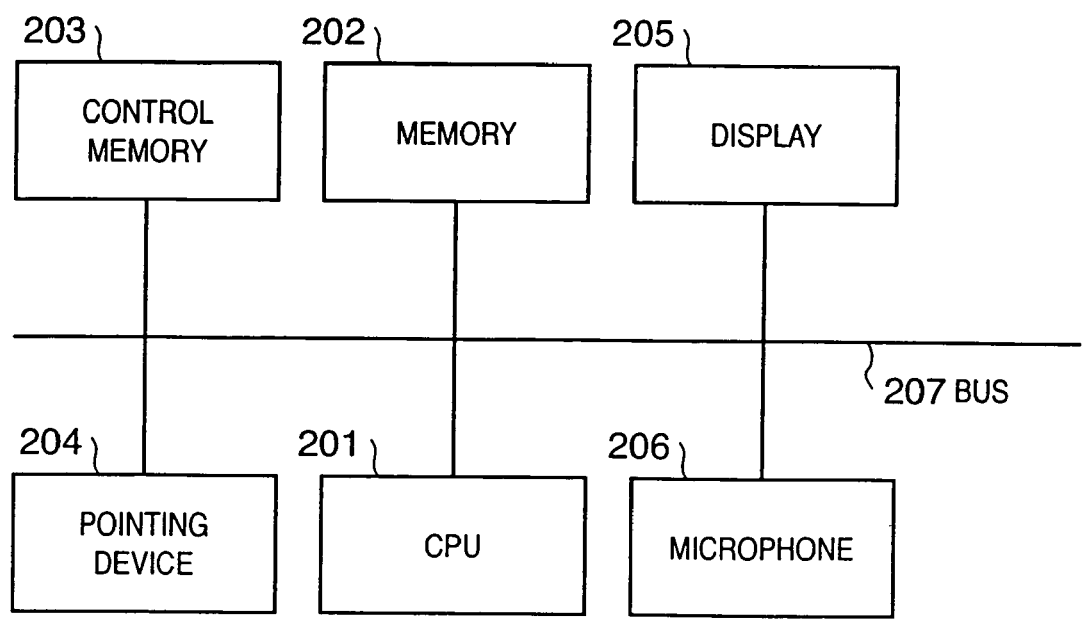
FIG. 2 is a block diagram showing a practical hardware arrangement of the speech interface apparatus according to the first embodiment.

FIG. 2 is a block diagram showing a practical hardware arrangement of the speech input apparatus of this embodiment.

Referring to FIG. 2, reference numeral 201 denotes a CPU which operates according to a program that implements the sequence to be described later. Reference numeral 202 denotes a memory which provides the field information holding unit 106, the active field holding unit 107, the grammar holding unit 109, the active grammar holding unit 110, the recognition result holding unit 113, and a storage area required for operation for executing the program.

Reference numeral 203 denotes a control memory for holding the program that implements the sequence to be described later. Reference numeral 204 denotes a pointing device which forms the aforementioned field selection unit 102. Reference numeral 205 denotes a display which forms the information display unit 101. Reference numeral 206 denotes a microphone which forms the speech input unit 111. Reference numeral 207 denotes a bus which connects the respective building components.

Figure 3:
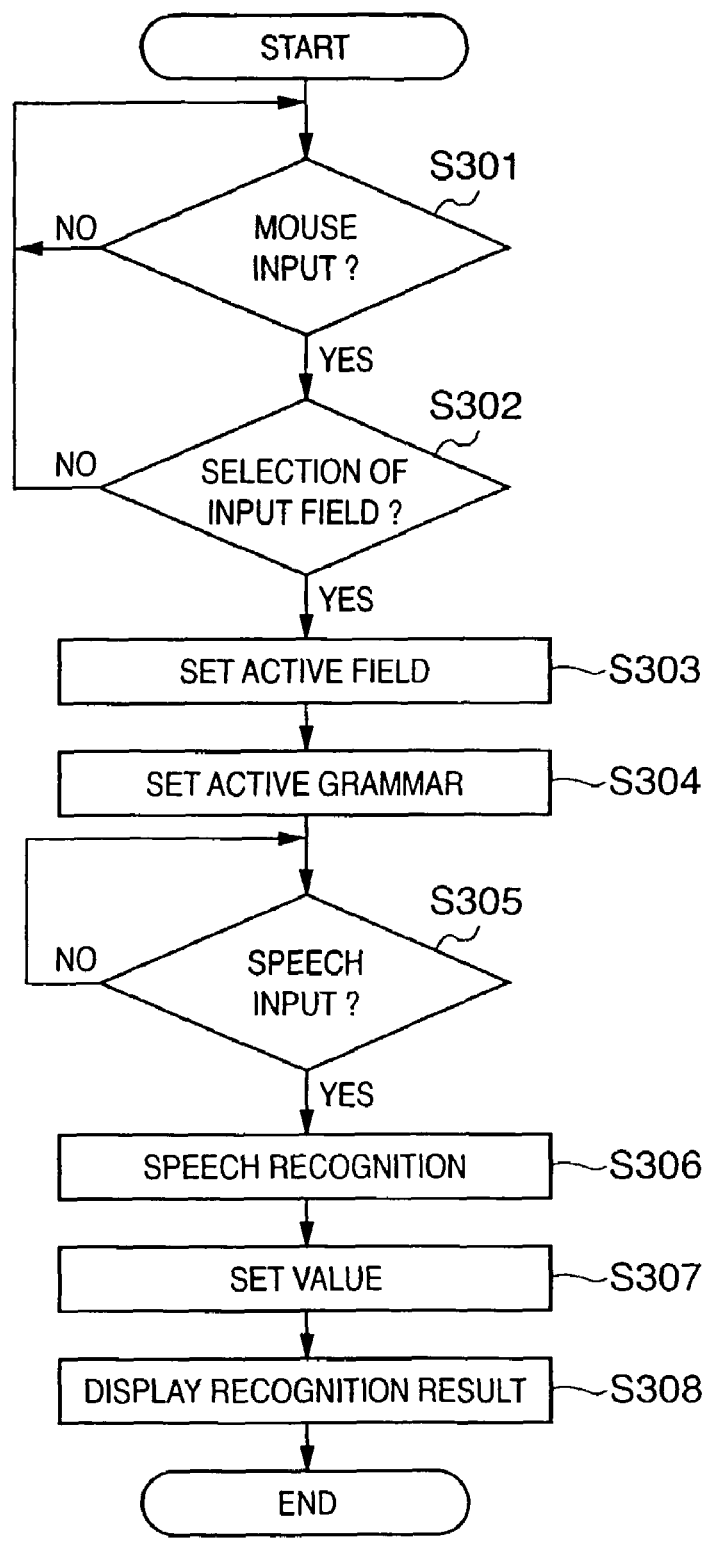
FIG. 3 is a flow chart showing an outline of the processing sequence in the first embodiment.

The operation of the apparatus of this embodiment will be explained below with reference to the flow chart shown in FIG. 3. In the following description, a case will be exemplified wherein a mouse is used as the pointing device 204.

When given contents are displayed, grammars used in speech recognition of respective input fields of the contents are loaded into the grammar holding unit 109, and the correspondence between the input fields and grammar ID is stored in the field information holding unit 106.

The input detection unit 103 checks in the first step S301 if an input from the mouse is detected. The mouse input may be recognized by detecting either a mouse click or stay of a mouse cursor on a given object for a predetermined period of time or more. This step is repeated until an input is detected. If an input is detected, the flow advances to step S302.

It is checked in step S302 if the input detected in step S301 is that for selecting an input field. If it is determined as a result of checking that the input is not selection of an input field, the flow returns to step S301. If the input is selection of an input field, the flow advances to step S303.

The field determination unit 104 checks in step S303 which input field is selected. The field switching unit 105 stores the selected input field in the active field holding unit 107.

In step S304, the grammar switching unit 108 stores an active grammar in the active grammar holding unit 110. Note that the active grammar is that corresponding to the input field held in the active field holding unit 107 of the grammars held in the grammar holding unit 109. The field information holding unit 106 checks the grammar ID corresponding to the current active field, and reads out a grammar corresponding to that grammar ID from the grammar holding unit 109.

It is checked in step S305 if speech is input from the speech input unit 111. This step is repeated until speech is input. If speech is input, the flow advances to step S306.

In step S306, the speech recognition unit 112 executes a recognition process of speech input in step S305 using the grammar held in the active grammar holding unit 110. The speech recognition result is held in the recognition result holding unit 113.

In step S307, the result held in the recognition result holding unit 113 is held in the field information holding unit 106. That is, in FIG. 4, a column of "value" corresponding to the active field holds the recognition result.

In step S308, the information display unit 101 displays the result held in the recognition result holding unit 113 in the input field held in the active field holding unit 107. In this way, the processing ends.

Figure 8:
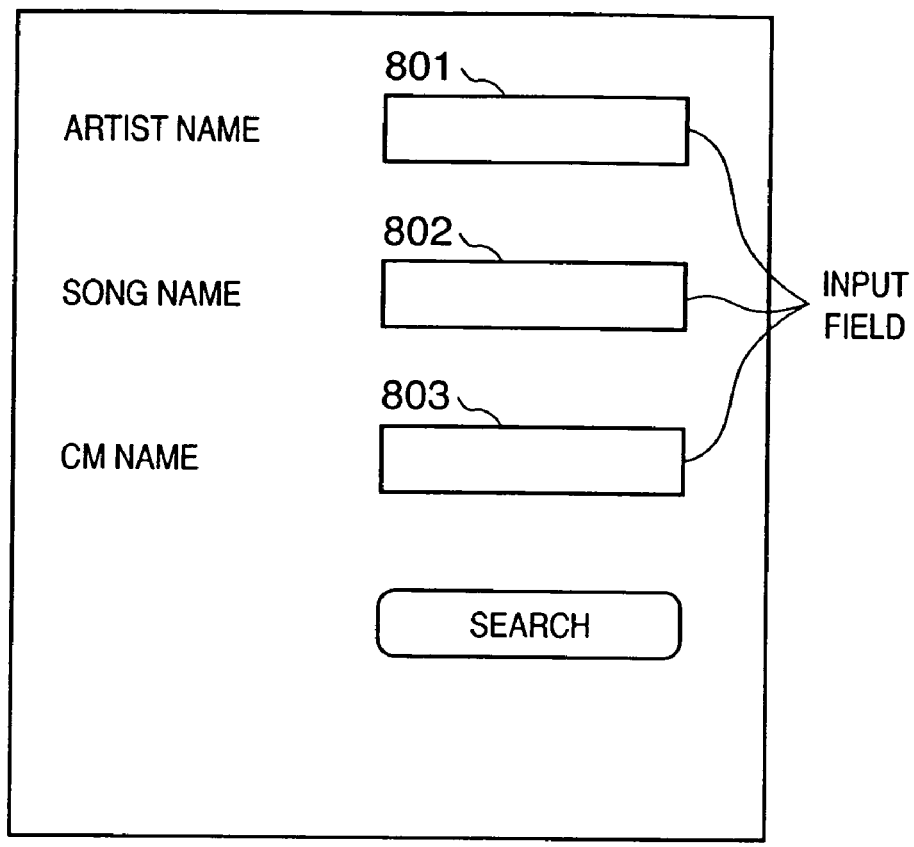
FIG. 8 shows an example of an input screen.

The processing contents will be described in detail below taking contents shown in FIG. 8 as an example. In FIG. 8, the numbers of first, second, and third input fields 801, 802, and 803 are respectively 1, 2, and 3.

Also, if grammars for the artist name, the song name, and the CM name are respectively first, second, and third grammars A, B, and C, the contents of the field information holding unit 109 are as shown in FIG. 4. When input speech is recognized according to the prior art, all three grammars, i.e., first, second, and third grammars A, B, and C are used.

On the other hand, in this embodiment, if, for example, the first input field 801 is selected by the mouse, input speech is recognized using only first grammar A corresponding to first input field 1. In this way, since the scale of a grammar used to recognize input speech can be relatively smaller than the prior art, the recognition rate of input speech can be greatly improved.

Likewise, if the second input field 802 is selected by the mouse, input speech is recognized using second grammar B corresponding to second input field 2; if the third input field 803 is selected, input speech is recognized using only third grammar C corresponding to third input field 3.

In the above embodiment, the mouse is used as means that forms the field selection unit 102, but another means may be used. For example, a display of the information display unit 101 may have a touch panel, and a desired field may be designated by a pen or finger.

Also, an n-th input field (arbitrary input field) may be designated using a ten-key pad. That is, a desired input field may be designated by a numerical value input. Furthermore, an input field may be designated by the direction of line of sight using a line of sight input device.

Or speech input objects (buttons, icons, images, or the like) having one-to-one correspondence with input fields may be displayed and one of these objects may be selected to select an input field.

In the above embodiment, the grammar to be used in speech recognition is switched when an input field is selected. Alternatively, an active input field may be discriminated at the time of input of speech so as to select a grammar.

Moreover, in the above embodiment, the start and end of speech input may be designated by a selection operation of an input field. For example, the selection timing of an input field is processed as a speech input start timing, and the selection end timing of the input field is processed as a speech input end timing. For example, speech input is captured while a mouse pointer operated by the mouse stays on a given input field.

In the above embodiment, the GUI is used as output means, and speech input is used as input means. However, the present invention is not limited to these specific means. For example, the GUI may be used together in input means, and speech may be used together in output means.

(Second Embodiment)

The second embodiment of the present invention will be described in detail below with reference to the accompanying drawings.

Figure 6:
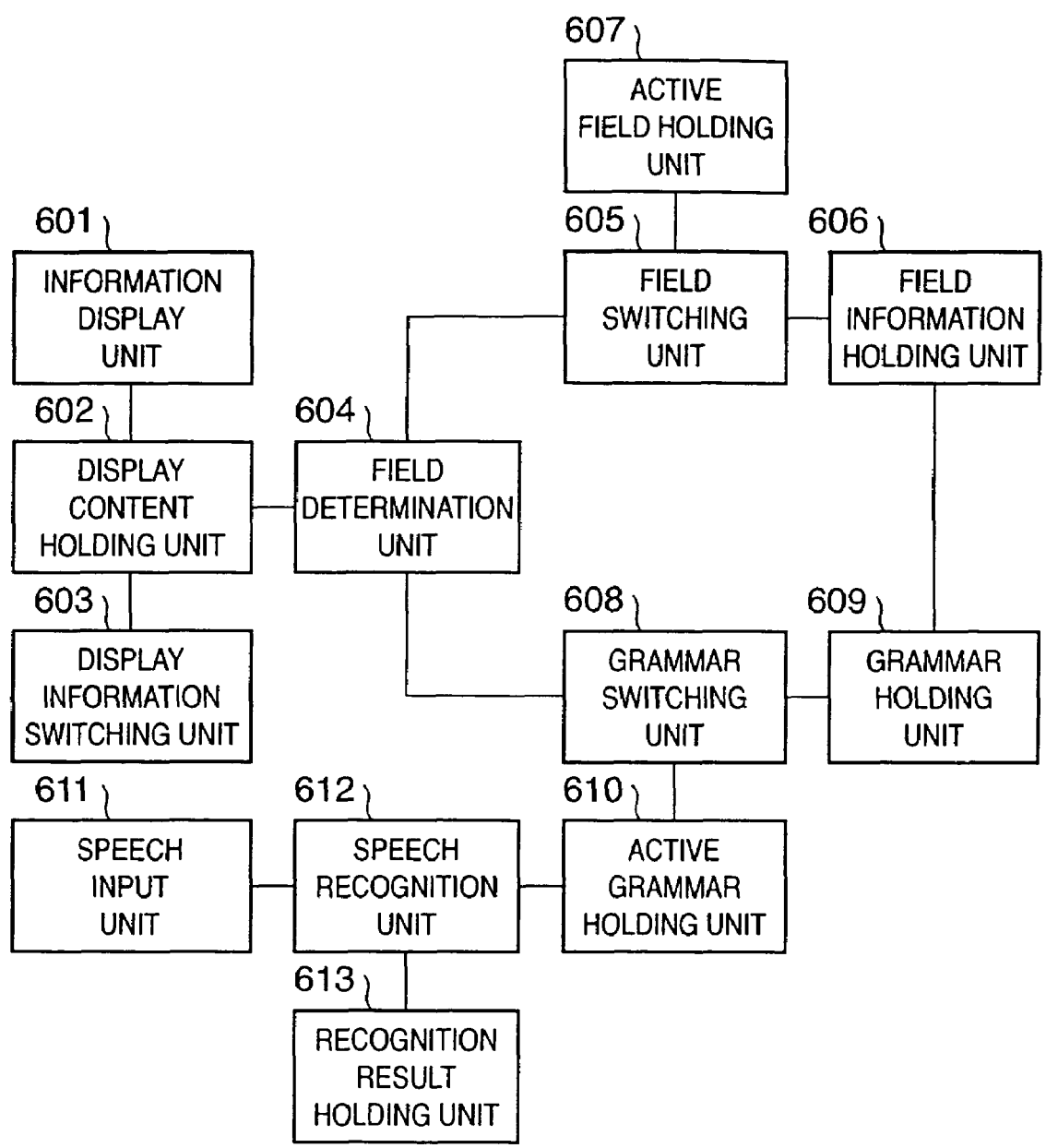
FIG. 6 is a block diagram showing a basic arrangement of a speech interface apparatus according to the second embodiment of the present invention.

FIG. 6 is a block diagram showing a basic arrangement of an apparatus according to the second embodiment of the present invention.

Referring to FIG. 6, reference numeral 601 denotes an information display unit. The information display unit 601 also displays information of input fields.

Reference numeral 602 denotes a display content holding unit for holding contents actually displayed on the information display unit 601. Reference numeral 603 denotes a display information switching unit for switching information to be displayed on the information display unit 601. Especially, if the information display unit has a small size, it cannot display all contents at one time. In such case, by switching display information, the remaining contents are displayed in turn. For example, this operation is implemented by page switching, scrolling, or the like.

Reference numeral 604 denotes a field determination unit for determining an input field actually displayed on the information display unit 601. An input field displayed on the information display unit 601 will be referred to as an active field. This embodiment assumes that the number of active fields is not limited to one unlike in the first embodiment.

Reference numeral 605 denotes a field switching unit for switching an active field on the basis of the determination result of the field determination unit 604. Reference numeral 606 denotes a field information holding unit for holding information for all the input fields in the currently displayed contents. The contents of the field information holding unit 606 are as shown in, e.g., FIG. 4.

More specifically, numbers are assigned to input fields, and the field information holding unit holds the input fields numbers, their values (no values are set in a default state), and IDs of grammars used in speech recognition of the corresponding input fields.

Reference numeral 607 denotes an active field holding unit for holding an active field. Reference numeral 608 denotes a grammar switching unit for switching the grammar on the basis of the determination result of the field determination unit 604. Note that the grammar selected by the grammar switching unit 608 will be referred to as an active grammar. Reference numeral 609 denotes a grammar holding unit for holding all grammars that can be used to recognize input speech in the contents currently displayed on the information display unit 601. The contents of the grammar holding unit 609 include grammar IDs and a description of the grammars, as shown in, e.g., FIG. 5. Information associated with a grammar to be used is described in the displayed contents. Assume that the grammar itself can be acquired from a disk device (not shown) and a server (not shown) on the network.

Reference numeral 610 denotes an active grammar holding unit for holding the ID of an active grammar. Reference numeral 611 denotes a speech input unit for inputting speech. Reference numeral 612 denotes a speech recognition unit for recognizing speech input from the speech input unit 611 using the grammar held in the active grammar holding unit 610. Reference numeral 613 denotes a recognition result holding unit for holding the recognition result of the speech recognition unit 612.

Since a practical arrangement of the speech input apparatus of the second embodiment is the same as that of the first embodiment shown in FIG. 2, it will be explained using FIG. 2 common to the first embodiment.

Referring to FIG. 2, reference numeral 201 denotes a CPU which operates according to a program that implements the sequence to be described later. Reference numeral 202 denotes a memory which provides the display content holding unit 602, the field information holding unit 606, the active field holding unit 607, the grammar holding unit 609, the active grammar holding unit 610, the recognition result holding unit 613, and a storage area required for operation for executing the program.

Reference numeral 203 denotes a control memory for holding the program that implements the sequence to be described later. Reference numeral 204 denotes a pointing device which implements the display content switching unit 603. Reference numeral 205 denotes a display which implements the information display unit 601. Reference numeral 206 denotes a microphone which implements the speech input unit 611. Reference numeral 207 denotes a bus which connects the respective building components.

The operation of the information input apparatus of the second embodiment will be explained below with reference to the flow chart shown in FIG. 7.

When given contents are displayed, grammars used in speech recognition of respective input fields of the contents are loaded into the grammar holding unit 609, and the correspondence between the input fields and grammar ID is stored in the field information holding unit 606.

It is checked in the first step S701 if speech is input from the speech input unit 611. This step 701 is repeated until speech is input, and if speech is input, the flow advances to step S702.

It is checked in step S702 based on the contents of the display content holding unit 602 which input fields are actually currently displayed.

In step S703, the field switching unit 605 stores the currently displayed input fields in the active field holding unit 607.

In step S704, the grammar switching unit 608 stores active grammars in the active grammar holding unit 610. Note that the active grammar is one corresponding to the input field held in the active field holding unit 607 of the grammars held in the grammar holding unit 609. The field information holding unit 606 checks the grammar ID corresponding to the current active field, and reads out a grammar corresponding to that grammar ID from the grammar holding unit 609.

In step S705, the speech recognition unit 612 executes a recognition process of speech input in step S701 using the grammars held in the active grammar holding unit 610. Assume that the recognition process returns a recognition result and the ID of the grammar used in recognition. More specifically, the grammars corresponding to a plurality of types of grammar IDs are used. The recognition results are obtained for respective grammar IDs, and a candidate with the highest similarity is output together with its grammar ID. The recognition result is held in the recognition result holding unit 613.

In step S706, an input field to which the input was made is determined based on the grammar ID obtained in step S705. Since the correspondence between the grammar IDs and input fields is stored in the field information holding unit 606, its contents can be looked up. For example, assume that the field information holding unit 606 has the contents shown in FIG. 4, and the active fields are "1" and "3". If third grammar C is returned as the grammar ID together with the recognition result, it is determined that this input was made for the third input field 3 corresponding to the third grammar C.

In step S707, the result held in the recognition result holding unit 613 is held in the field information holding unit 606. That is, in FIG. 4, a column of "value" corresponding to the active field holds the recognition result. In step S708, the information display unit 601 displays the result held in the recognition result holding unit 613 in the input field determined in step S706. In this way, the processing ends.

The processing contents will be described in detail below taking contents shown in FIG. 8 as an example.

Figure 9:
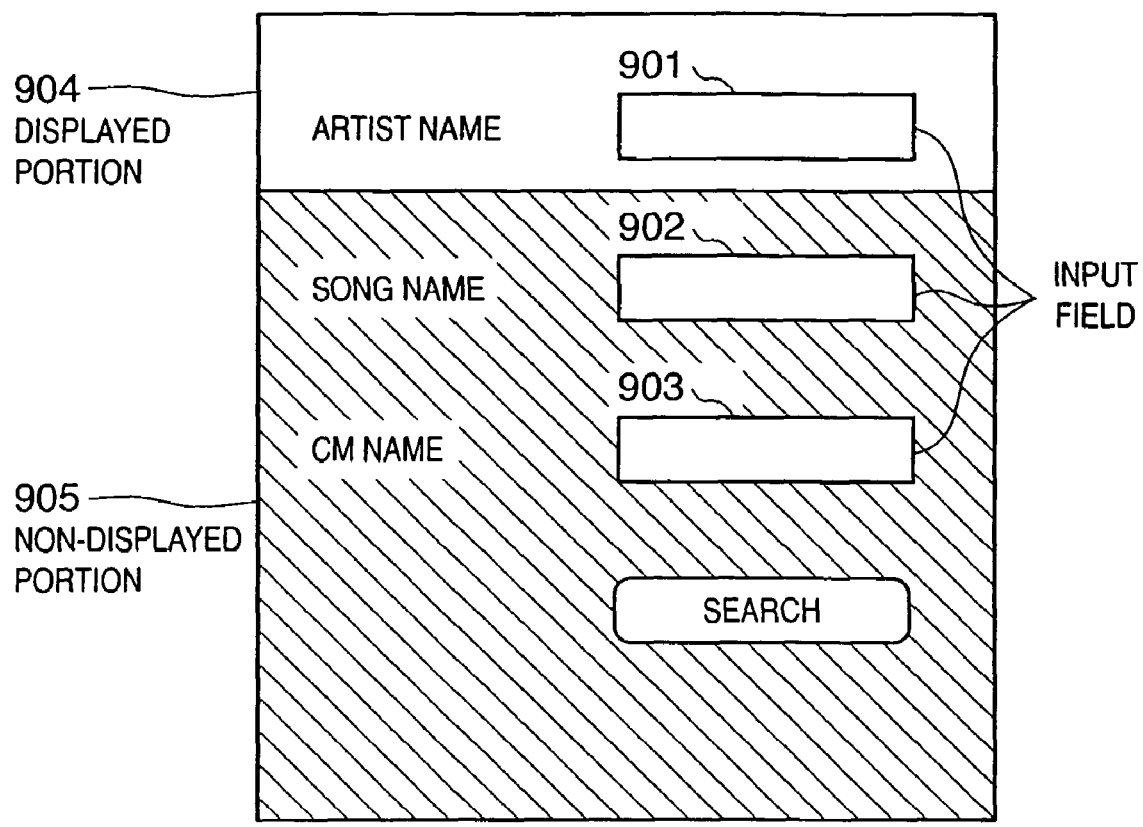
FIG. 9 is a view for explaining a displayed portion and non-displayed portions on the input screen.

Assume that the contents shown in FIG. 8 are displayed, as shown in FIG. 9. In FIG. 9, reference numeral 904 denotes an actually displayed portion; and 905 denotes a non-displayed portion.

Assume that the numbers of first, second, and third input fields 901, 902, and 903 are respectively 1, 2, and 3. If grammars for the artist name, the song name, and the CM name are respectively first, second, and third grammars A, B, and C, the contents of the field information holding unit 609 are as shown in FIG. 4.

When input speech is recognized according to the prior art, three grammars, i.e., first, second, and third grammars A, B, and C are used. On the other hand, in this embodiment, since an actually displayed input field is only 901, input speech is recognized using grammar A alone corresponding to input field 1. In this way, since the scale of a grammar used to recognize input speech can be relatively smaller than the prior art, the recognition rate of input speech can be greatly improved.

Even when a plurality of input fields are displayed, since the grammars used in speech recognition are limited to those corresponding to the displayed input field, high recognition precision can be maintained. Upon applying the recognition result to one of a plurality of active fields, the input field as an application destination is determined based on the grammar used in speech recognition. For this reason, even when a plurality of input fields are displayed, a value (speech recognition result) is automatically set in an appropriate input field, thus improving operability.

(Third Embodiment)

The third embodiment of the present invention will be described in detail below with reference to the accompanying drawings.

Since the basic arrangement and hardware arrangement of the apparatus according to the third embodiment are the same as those of the second embodiment shown in FIGS. 6 and 2, a detailed description thereof will be omitted.

The third embodiment describes the contents in the second embodiment using hypertext, and executes a different process for the contents unlike in the second embodiment. The third embodiment will be described in detail below with reference to FIGS. 10 to 13.

FIG. 10 shows an example of contents expressed by a hypertext document. The hypertext document is held in the display contents holding unit 602, and is displayed by the information display unit 601, as shown in FIG. 11.

A tag 101 in FIG. 10 indicates the designation of a grammar-display link, i.e., whether or not a grammar is switched in correspondence with switching of a display screen. If this tag is described, a process for switching a grammar in synchronism with a change in display is done; otherwise, a process for inhibiting switching of a grammar in synchronism with a change in display is done. Details of this process will be described later using the flow chart shown in FIG. 13.

Reference numeral 102 denotes a description of the type of data to be input to an input field "artist name", the size of that input field, and position information ([http://temp/art.grm]) of a grammar used in the input field. Likewise, reference numerals 103, 104, 105, and 106 denote descriptions of information that pertains to respective input fields, and position information of grammars stored in correspondence with these fields.

Figure 11:
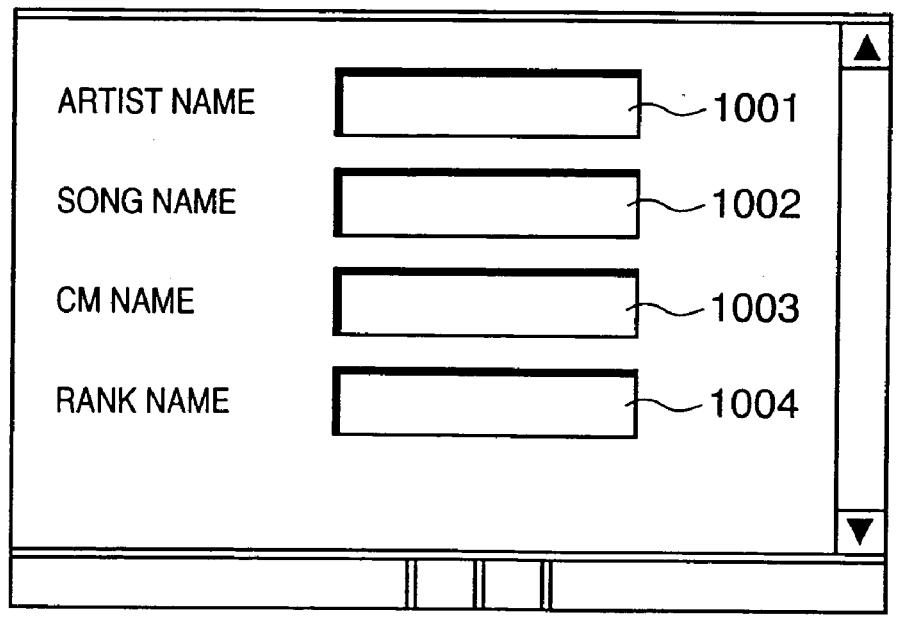
FIG. 11 shows a practical display example of the input screen using the hypertext document shown in FIG. 10.

FIG. 11 shows the display state of hypertext shown in FIG. 10 on the information display unit 601.

Figure 12:
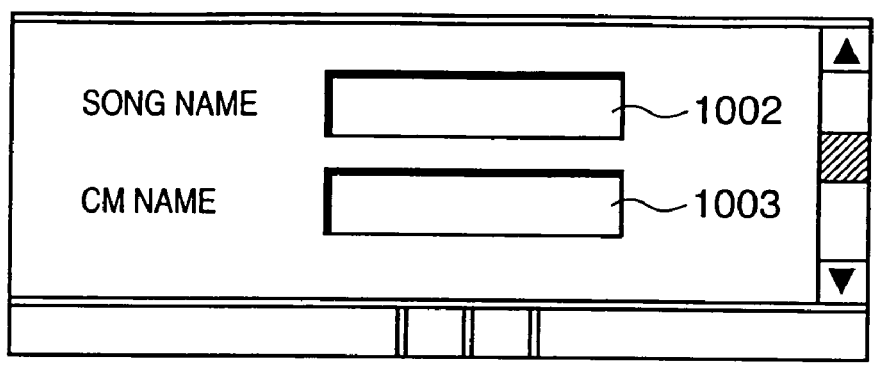
FIG. 12 shows a practical display example of the input screen.

Contents shown in FIG. 11 include four input fields (1001, 1002, 1003, and 1004). If a display screen is sufficiently large, all the four input fields are displayed within one screen; if a display screen is small, some of the four input fields are displayed, as shown in FIG. 12. In FIG. 12, the two input fields 1002 and 1003 are displayed. In this case, by changing the display state of the screen by, e.g., vertically scrolling the screen using a scroll bar, non-displayed fields can be confirmed.

Figure 13:
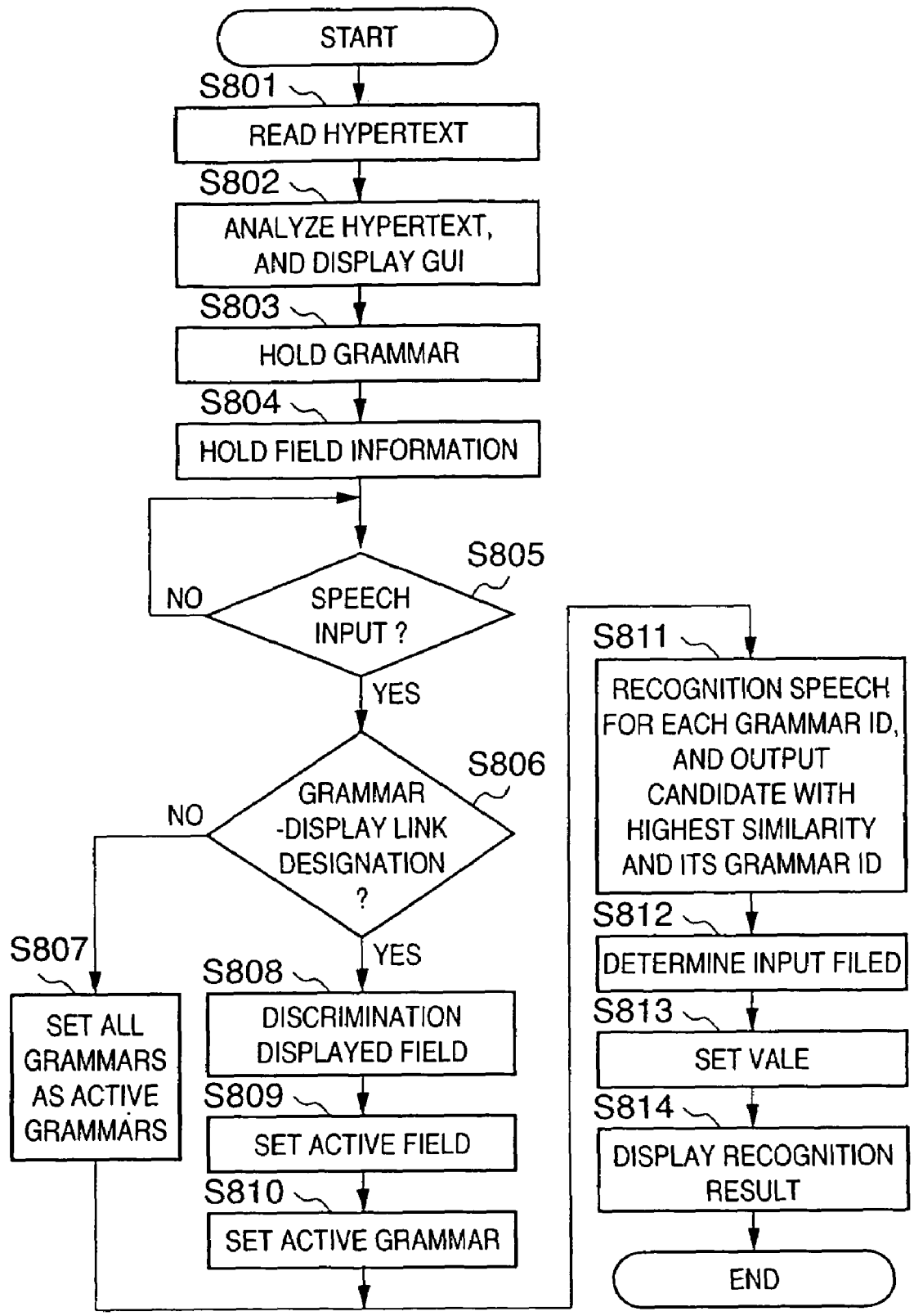
FIG. 13 is a flow chart showing an outline of the processing sequence in the second embodiment when the hypertext document shown in FIG. 10 is used.

The operation of the information input apparatus of this embodiment will be described below with reference to FIG. 13.

In step S801, the hypertext shown in FIG. 10 is read. In step S802, the hypertext read in step S801 is analyzed, and a GUI shown in FIG. 11 is displayed based on the analysis result. The position of each grammar, e.g., is detected based on the analysis result. Also, the contents of a tag, e.g., whether or not a (<form> tag contains an entry, and the like are analyzed.

In step S803, grammars are read based on the grammar position information detected in step S802, and four grammars corresponding to the artist name, the song name, the CM name, and the rank name are held in the grammar holding unit 609. In step S804, field information, i.e., the correspondence between the input fields and grammars, is held in the field information holding unit 606 on the basis of the analysis result in step S802. In this example, grammars http://temp/art.grm, http://temp/kyoku.grm, http://temp/cm.grm, and http://temp/rank.grm are held in correspondence with the input fields 1001, 1002, 1003, and 1004, respectively.

In step S805, speech input is detected. If speech input is detected, the flow advances to step S806. It is checked in step S806 based on the analysis result in step S802 if the <form> tag contains an entry [gramselect="display"], i.e., a grammar to be used is selected in synchronism with a change in display. If that entry is found, the flow advances to step S808; otherwise, the flow advances to step S807.

If no entry is found, all grammars are set as active grammars in step S807. That is, the four grammars are held in the active grammar holding unit 610, and the flow advances to the speech recognition process in step S811.

If an entry is found, it is checked in step S808 which input fields are currently actually displayed. In step S809, the currently displayed input fields are held in the active field holding unit 607. In step S810, the grammars corresponding to the input fields held in the active field holding unit 607 of the four grammars held in step S803 are held as active grammars in the active grammar holding unit 610. In FIG. 12, two out of the four fields, i.e., the input fields 1002 and 1003 are displayed. The grammars corresponding to these two input fields are http://temp/kyoku.grm and http://temp/cm.grm, and these two grammars are held as active grammars.

In step S811, a recognition process of input speech is executed using the grammars held as active grammars in step S807 or S810. Assume that the recognition process returns a recognition result and the ID of the grammar used in recognition. The recognition result and the ID of the grammar used in recognition are held in the recognition result holding unit 613.

In step S812, an input field to which the input was made is determined based on the grammar ID obtained in step S811. Since the correspondence between the grammar IDs and input fields is held in the field information holding unit 606, it is looked up.

In step S813, the recognition result held in the result holding unit 613 is held in the field information holding unit 606. More specifically, the recognition result is held in a column of value in FIG. 4.

In step S814, the information display unit displays the result held in the recognition result holding unit 613 in the input field determined in step S812.

After that, if the user instructs the device to submit the recognition result displayed in the input field by pressing, e.g., a search button or the like, the recognition result is submitted to an application, which operates according to that result.

For example, when the user presses a search button while an artist name (recognition result) is displayed in the column 801 of artist name in FIG. 8, the displayed artist name or the like is submitted to an application, and a search result using the artist name can be obtained.

In this manner, the processing ends.

When grmselect="display" is set in hypertext shown in FIG. 10, and a display is made, as shown in FIG. 11, input can be made to the four input fields, and when a display is made, as shown in FIG. 12, input can be made to only the two input fields. When grmselect="display" is not set, input can be made to the four input fields independently of whether or not the corresponding field is displayed.

According to this embodiment, when input items to be displayed include an item corresponding to a complex grammar, display is controlled not to display that item, thus limiting the input fields, and improving the recognition rate.

According to this embodiment, since a speech recognition process is done using only grammars corresponding to the actually displayed input fields, the scale of grammars can be reduced and, hence, the recognition rate of input speech can be improved.

According to this embodiment, the input fields are limited in accordance with the presence/absence of a tag indicating whether or not a grammar is switched in response to switching of the display screen. However, the present invention is not limited to this. For example, the input fields may be limited in accordance with description contents in a tag. More specifically, if grmselect="none" is set in a tag, all grammars may be used; when grmselect="display" is set, the grammars to be used can be limited in synchronism with a change in display. In this case, if no tag is set, recognition may be inhibited.

According to this embodiment, the currently displayed input fields are handled as active fields. However, the present invention is not limited to this. When a frame of an HTML document is used, or when a plurality of windows are used, input fields present on the currently active frame (the frame means a partitioned area on a web page, and a document can be scrolled in each area) or window may be handled as active fields.

According to this embodiment, the GUI is used as output means, and speech input is used as input means. However, the present invention is not limited to these specific means. For example, the GUI may be used together in input means, and speech may be used together in output means.

When a tag indicating whether or not a grammar is switched in response with switching of the display screen is set, the user may be informed of that. More specifically, an indicator or the like on the GUI may be provided. With this arrangement, the user can recognize in advance whether all grammars indicated by input fields are selected or specific grammars indicated by display input fields are selected, thus improving the operability of this information processing apparatus.

The aforementioned embodiments may be applied to either a system consisting of a plurality of devices or an apparatus consisting of a single device.

As a recording medium that stores a program code of a control program for implementing the functions of the aforementioned embodiments, for example, a floppy disk, a hard disk, an optical disk, a magneto-optical disk, a CD-ROM, a magnetic tape, a nonvolatile memory card, a ROM, and the like may be used.

The program code is included in the embodiments of the present invention when the functions of the aforementioned embodiments are implemented by collaboration of the program code of the control program and an OS (operating system), another application software, or the like, which is running on a central processing unit 2.

Furthermore, the present invention includes a case wherein the functions of the aforementioned embodiments are implemented by some or all of actual processing operations executed by a CPU or the like arranged in a function extension board or a function extension unit, after the supplied program code is stored in a memory of the extension board or unit.

As described above, according to the present invention, since speech recognition can be done in accordance with the display states of input items, the recognition rate of input speech can be improved.

What is claimed is:

1. An information processing apparatus comprising:
    display control means for controlling a display to display a plurality of input fields;
    determining means for determining whether or not one of the plurality of input fields is designated by a user;
    selection means for selecting grammar corresponding to the designated input field determined by said determining means;
    speech determining means for determining the inputting of input speech after the determining by said determining means that one of the plurality of input fields is designated by a user, and the selection by said selection means of a grammar corresponding to the designated input field; and
    speech recognition means for recognizing the input speech determined to be input by said speech determining means by utilizing the grammar selected by said selection means.

2. The apparatus according to claim 1, wherein said display control means controls a display of a recognition result of said speech recognition means in the designated input field.

3. An information processing method comprising:
    a display control step of controlling a display to display a plurality of input fields;
    a determining step of determining whether or not one of the plurality of input fields is designated by a user;
    a selection step of selecting grammar corresponding to the designated input field determined in said determining step;
    a speech determining step of determining the inputting of input speech after the determining by said determining step that one of the plurality of input fields is designated by a user, and the selection by said selection step of a grammar corresponding to the designated input field; and
    a speech recognition step of recognizing the input speech determined to be input by said speech determining step by utilizing the grammar selected in said selection step.

4. The method according to claim 3, wherein said display control step controls a display of a recognition result of said speech recognition step in the designated input field.

5. A control program embodied in a computer-readable medium for making a computer implement an information process, comprising:
    code of a display control step of controlling a display to display a plurality of input fields;
    code of a determining step of determining whether or not one of the plurality of input fields is designated by a user;
    code of a selection step of selecting grammar corresponding to the designated input field determined in said determining step;
    code of a speech determining step of determining the inputting of input speech after the determining by said determining step that one of the plurality of input fields is designated by a user, and the selection by said selection step of a grammar corresponding to the designated input field; and
    code of a speech recognition step of recognizing the input speech determined to be input by said speech determining step by utilizing the grammar selected in said selection step.

6. The control program according to claim 5, wherein said display control step controls a display of a recognition result of said speech recognition step in the designated input field.

7. An information processing apparatus comprising:
    display control means for controlling a display to display a plurality of input fields;
    detecting means for detecting whether or not a mouse pointer is staying on one of the plurality of input fields;
    selection means for, when detected by said detecting means that the mouse pointer is staying on one of the plurality of input fields, selecting grammar corresponding to the input field;

speech receiving means for receiving input speech while the mouse pointer is staying on the input field; and speech recognition means for recognizing input speech received by said speech receiving means by utilizing the grammar selected by said selection means.

8. An information processing method comprising:

a display control step of controlling a display to display a plurality of input fields;

a detecting step of detecting whether or not a mouse pointer is staying on one of the plurality of input fields;

a selection step of, when detected in said detecting step that the mouse pointer is staying on one of the plurality of input fields, selecting grammar corresponding to the input field;

a speech receiving step of receiving input speech while the mouse pointer is staying on the input field; and a speech recognition step of recognizing input speech received in said speech receiving step by utilizing the grammar selected in said selection step.

9. A control program embodied in a computer-readable medium for making a computer implement an information process, comprising:

code of a display control step of controlling a display to display a plurality of input fields;

code of a detecting step of detecting whether or not a mouse pointer is staying on one of the plurality of input fields;

code of a selection step of, when detected in said detecting step that the mouse pointer is staying on one of the plurality of input fields, selecting grammar corresponding to the input field;

code of a speech receiving step of receiving input speech while the mouse pointer is staying on the input field; and code of a speech recognition step of recognizing input speech received in said speech receiving step by utilizing the grammar selected in said selection step.

10. An information processing apparatus comprising:

display control means for controlling a display to display at least one of a plurality of input fields, the display being configured to display less than all of the plurality of input fields simultaneously;

selection means for selecting a specific grammar corresponding to an input field displayed on the display to be used for speech recognition of speech inputted for the displayed input field; and speech recognition means for recognizing input speech input for the displayed input field by utilizing the grammar selected by said selection means without utilizing grammar corresponding to input fields not displayed on the display.

11. An information processing method comprising:

a display control step of controlling a display to display at least one of a plurality of input fields, the display being configured to display less than all of the plurality of input fields simultaneously;

a selection step of selecting a specific grammar corresponding to an input field being displayed on the display to be used for speech recognition of speech inputted for the displayed input field; and a speech recognition step of recognizing input speech input for the displayed input field by utilizing the grammar selected in said selection step without utilizing grammar corresponding to input fields not displayed on the display.

12. A control program embodied in a computer-readable medium for making a computer implement an information process, comprising:

code of a display control step of controlling a display to display at least one of a plurality of input fields, the display being configured to display less than all of the plurality of input fields simultaneously;

code of a selection step of selecting a specific grammar corresponding to an input field being displayed on the display to be used for speech recognition of speech inputted for a displayed input field; and code of a speech recognition step of recognizing input speech input for the displayed input field by utilizing the grammar selected in said selection step without utilizing grammar corresponding to input fields not displayed on the display.

* * * * *

UNITED STATES PATENT AND TRADEMARK OFFICE
CERTIFICATE OF CORRECTION

| | | |
|---|---|---|
| PATENT NO. | : 7,024,361 B2 | Page 1 of 1 |
| APPLICATION NO. | : 10/289366 | |
| DATED | : April 4, 2006 | |
| INVENTOR(S) | : Tetsuo Kosaka et al. | |

Figure 7:
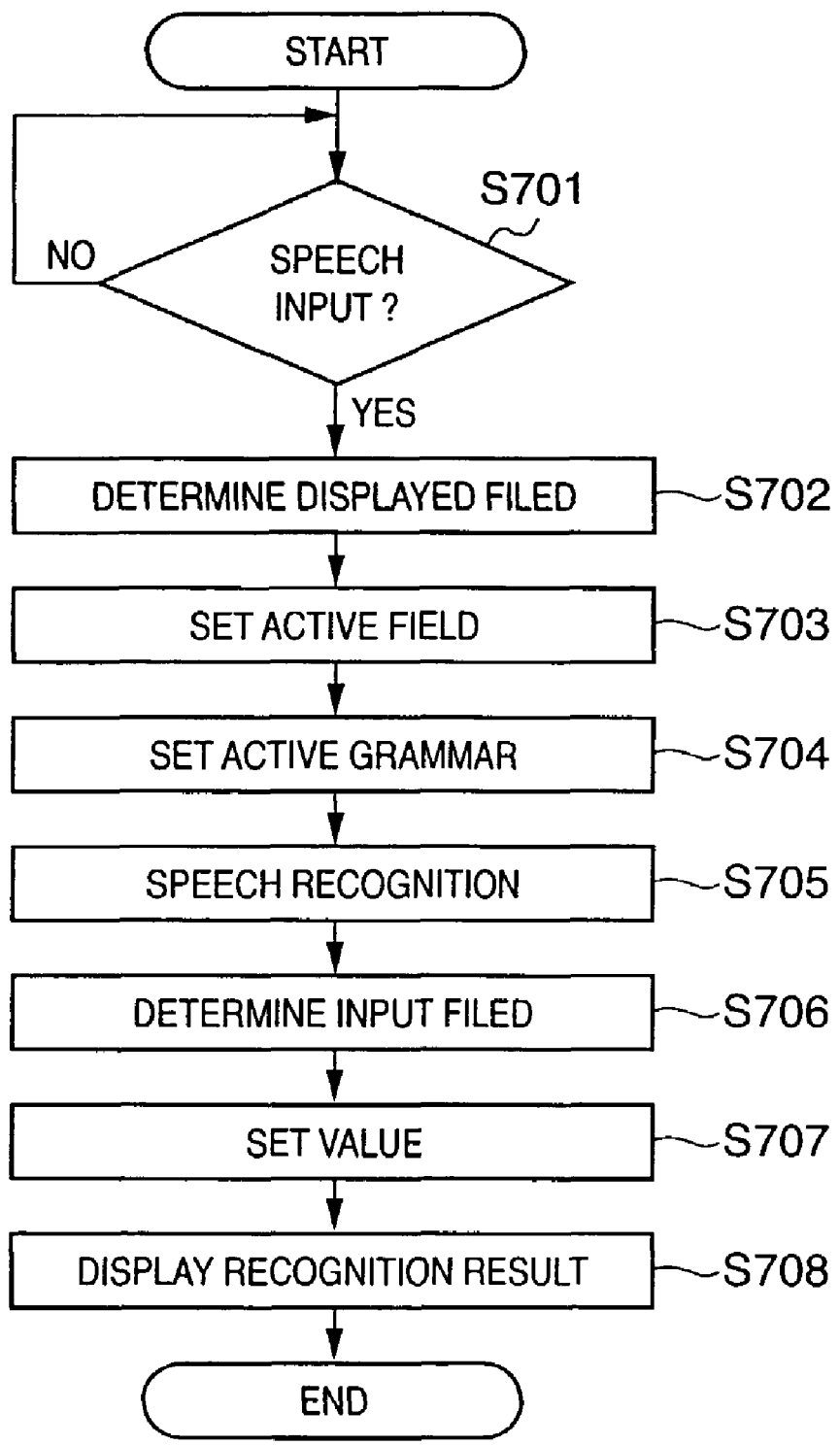
FIG. 7 is a flow chart showing an outline of the processing sequence in the second embodiment.

It is certified that error appears in the above-identified patent and that said Letters Patent is hereby corrected as shown below:

IN THE DRAWINGS
Sheet 7, Fig. 7, steps S702 and S706, "FILED" should read --FIELD--.

COLUMN 8
Line 5, "5701" should read --S701--.

COLUMN 9
Line 50, "(<form>" should read --<form>--.

Signed and Sealed this

Sixteenth Day of January, 2007

JON W. DUDAS
*Director of the United States Patent and Trademark Office*